US012798705B2

(12) United States Patent
Subramanian et al.

(10) Patent No.: US 12,798,705 B2
(45) Date of Patent: Nov. 17, 2026

(54) AUTONOMOUS VEHICLE SYSTEM AND ASSEMBLY

(71) Applicants: Azhagu Subramanian, Troy, MI (US); Warren Young, Troy, MI (US)

(72) Inventors: Azhagu Subramanian, Troy, MI (US); Warren Young, Troy, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 282 days.

(21) Appl. No.: 18/287,070

(22) PCT Filed: Apr. 15, 2022

(86) PCT No.: PCT/US2022/024945
§ 371 (c)(1),
(2) Date: Oct. 16, 2023

(87) PCT Pub. No.: WO2022/221615
PCT Pub. Date: Oct. 20, 2022

(65) Prior Publication Data

US 2024/0199151 A1 Jun. 20, 2024

Related U.S. Application Data

(60) Provisional application No. 63/175,087, filed on Apr. 15, 2021.

(51) Int. Cl.
*B62D 63/02* (2006.01)
*B60K 1/00* (2006.01)
(Continued)

(52) U.S. Cl.
CPC ...... *B62D 63/025* (2013.01); *B60K 2001/001* (2013.01); *B62D 21/12* (2013.01);
(Continued)

(58) Field of Classification Search
CPC .... B62D 63/025; B62D 31/025; B62D 21/12; B62D 24/04; B60K 1/00; B60K 1/02;
(Continued)

(56) References Cited

U.S. PATENT DOCUMENTS 5,401,056 A 3/1995 Eastman
5,687,895 A 11/1997 Allison et al.
(Continued)

FOREIGN PATENT DOCUMENTS

DE 102016209099 A1 * 7/2017 ........... B62D 63/025
DE 102019008836 A1 * 8/2020 ........... B62D 63/025
(Continued)

OTHER PUBLICATIONS

European Search Report for EP22788981.3, dated Feb. 4, 2025.

*Primary Examiner* — James J Taylor, II
(74) *Attorney, Agent, or Firm* — DICKINSON WRIGHT PLLC

(57) ABSTRACT

An autonomous vehicle assembly comprises a chassis assembly and a storage assembly. The chassis assembly includes a front chassis module and a rear chassis module that are selectively connectable to one another. The front chassis module includes a front wheel and an EBS assembly for steering the front wheel and the rear chassis module includes a rear wheel and a propulsion assembly for driving the rear wheel. An autonomous driving module is selectively connected to the chassis assembly and independently in communication with the EBS assembly and the propulsion assembly.

18 Claims, 13 Drawing Sheets

(51) Int. Cl.

| | |
|---|---|
| ***B62D 21/12*** | (2006.01) |
| ***B62D 24/04*** | (2006.01) |
| ***B62D 65/04*** | (2006.01) |
| ***B62D 65/18*** | (2006.01) |

(52) U.S. Cl.
CPC .............. *B62D 24/04* (2013.01); *B62D 65/04* (2013.01); *B62D 65/18* (2013.01)

(58) Field of Classification Search
CPC ............. B60K 2001/001; H02K 7/006; H02K 7/116; B60L 15/007; B60L 15/2036; F16H 2200/0021; B60Y 2200/91
See application file for complete search history.

(56) References Cited

U.S. PATENT DOCUMENTS

| | | | | |
|---|---|---|---|---|
| 8,335,607 | B2 * | 12/2012 | Gatten | B60D 1/64 701/31.1 |
| 9,494,940 | B1 | 11/2016 | Zoox | |
| 10,668,926 | B2 * | 6/2020 | Birnschein | B60R 16/0231 |
| 11,358,445 | B1 * | 6/2022 | Shahoian | B60J 5/12 |
| 11,414,002 | B2 * | 8/2022 | Georgeson | B60P 3/007 |
| 11,554,824 | B2 * | 1/2023 | Lee | B60L 15/32 |
| 11,787,276 | B2 * | 10/2023 | Drabon | B60K 1/04 180/56 |
| 11,845,504 | B2 * | 12/2023 | Xin | B62D 65/04 |
| 12,179,602 | B2 * | 12/2024 | Lee | B62D 21/12 |
| 12,325,294 | B2 * | 6/2025 | Naish | B60J 5/0497 |
| 2017/0203801 | A1 | 7/2017 | Hung et al. | |
| 2018/0134334 | A1 | 5/2018 | Kentley-Klay | |
| 2018/0330313 | A1 | 11/2018 | Clarke et al. | |
| 2019/0113935 | A1 | 4/2019 | Kuo et al. | |
| 2019/0197927 | A1 * | 6/2019 | Matsuoka | G09F 15/0056 |
| 2020/0269878 | A1 | 8/2020 | Dogishi et al. | |

FOREIGN PATENT DOCUMENTS

| | | | | |
|---|---|---|---|---|
| EP | 3533691 | A1 | 9/2019 | |
| FR | 2797246 | A1 | 2/2001 | |
| TR | 202008334 | A2 * | 12/2021 | |
| WO | WO-2017144905 | A1 * | 8/2017 | B60K 1/00 |
| WO | 2020149774 | A1 | 7/2020 | |

* cited by examiner

AUTONOMOUS VEHICLE SYSTEM AND ASSEMBLY

CROSS-REFERENCE TO RELATED APPLICATIONS

This U.S. National Stage Patent Application claims the benefit of PCT International Patent Application Serial No. PCT/US2022/024945 filed on Apr. 15, 2022 entitled "AUTONOMOUS VEHICLE SYSTEM AND ASSEMBLY" which claims the benefit of and priority to U.S. Provisional Patent Application Ser. No. 63/175,087 filed on Apr. 15, 2021, and titled "Autonomous Vehicle System And Assembly," the entire disclosures of which are hereby incorporated by reference.

BACKGROUND OF THE INVENTION

1. Field of the Invention

The present invention relates an autonomous vehicle system and assembly. More particularly, the present invention relates to an autonomous vehicle system including at least one autonomous vehicle assembly with a modular construction.

2. Related Art

This section provides background information related to the present disclosure which is not necessarily prior art.

As productivity and efficiency are the goals in any industrial environment, autonomous vehicles are being utilized, now more than ever, for a number of tasks. For example, autonomous vehicles are often used in warehouses for moving items from one location to another. These autonomous vehicles are designed to follow preprogramed paths and/or logic to move items, such as inventory, between two or more locations. Accordingly, inventory or other items can be loaded onto an autonomous vehicle at a first location whereafter the autonomous vehicle delivers the inventory or other items to a second location. While incorporating autonomous vehicles has greatly improved productivity in industrial environments, there are still a number of shortcomings associated with their use. For example, autonomous vehicles are typically designed for specifically defined tasks, such as the transportation of precisely sized inventory. As such, the functionality of autonomous vehicles is generally narrowly defined and not adaptable for additional uses. In addition, autonomous vehicles are technologically complex and expensive to construct so that they are difficult to service and expensive to replace.

Accordingly, there is a continuing desire to further develop and refine autonomous vehicle systems such that they are not subjected to traditional drawbacks and provide easily modifiable functionality and serviceability.

SUMMARY OF THE INVENTION

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims. This section provides a general summary of the disclosure and is not to be interpreted as a complete and comprehensive listing of all of the objects, aspects, features and advantages associated with the present disclosure.

According to one aspect of the disclosure, an autonomous vehicle assembly is provided. The autonomous vehicle assembly comprises a chassis assembly that includes a front chassis module and a rear chassis module are selectively connectable to one another. The front chassis module includes at least one front wheel and the rear chassis module includes at least one rear wheel. An EBS assembly is located in at least one of the front chassis assembly and the rear chassis assembly for steering at least one of the at least one front wheel and the at least one rear wheel. A propulsion assembly is located in at least one of the front chassis assembly and the rear chassis assembly for driving at least one of the at least one front wheel and the at least one rear wheel.

According to another aspect of the disclosure, an autonomous driving module is selectively connected to the chassis assembly and independently in communication with the EBS assembly and the propulsion assembly.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein.

DESCRIPTION OF THE ENABLING EMBODIMENT

Example embodiments will now be described more fully with reference to the accompanying drawings. In general, the subject disclosure is directed to an autonomous vehicle system including at least one autonomous vehicle assembly with a modular construction. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Referring to the Figures, wherein like numerals indicate corresponding parts throughout the views, the autonomous vehicle system including an autonomous vehicle assembly with a modular construction is intended for providing a design that is easily adaptable and serviceable via interchanging a selection of functional modules.

Figure 1:
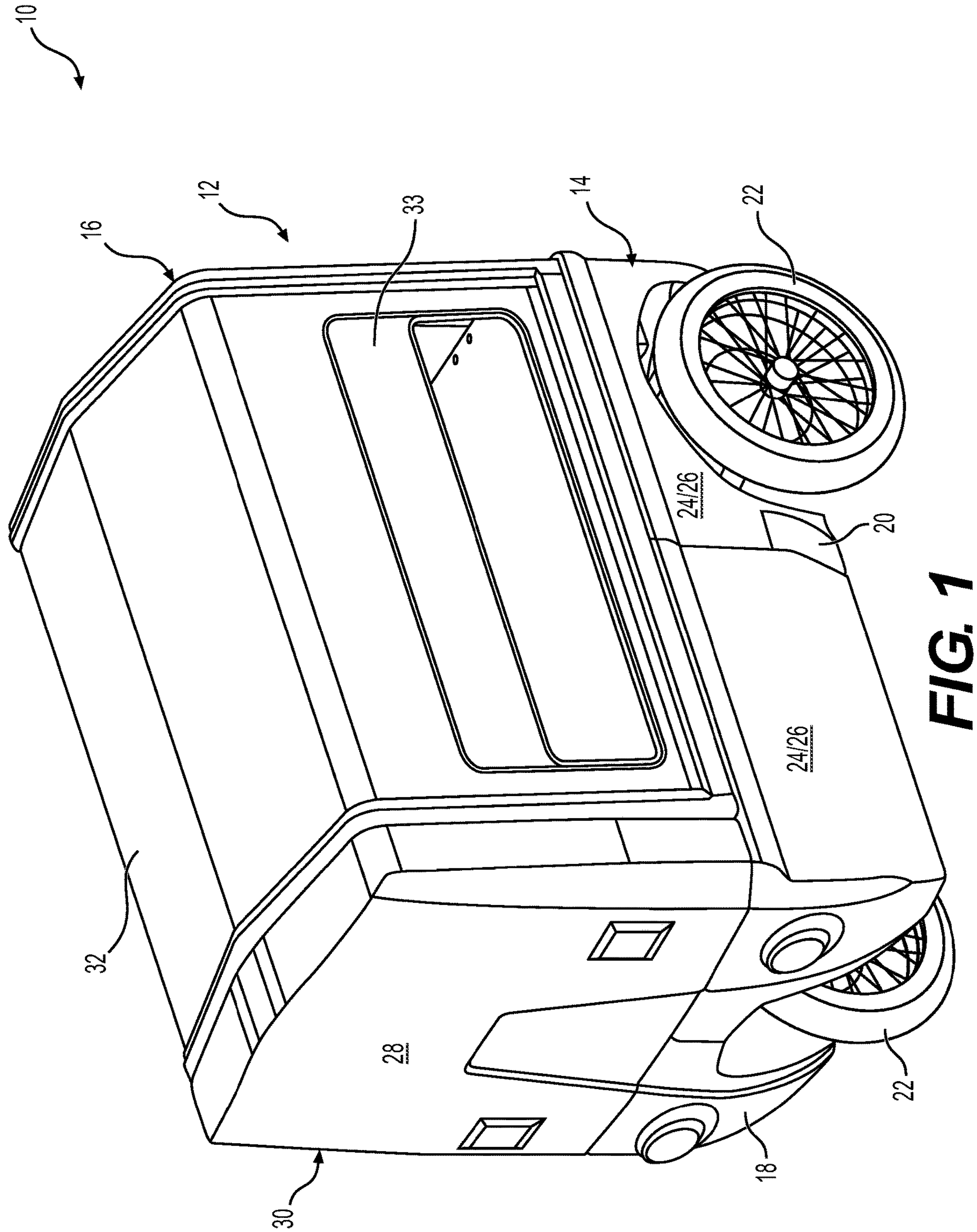
FIG. 1 is a perspective view of an autonomous vehicle system including an autonomous vehicle assembly with a modular construction.

Referring initially to FIG. 1, the autonomous vehicle system 10 includes at least one autonomous vehicle assembly 12 that is perspectively illustrated. The autonomous vehicle assembly 12 includes a modular construction including a series of functional modules that can be easily interchanged to facilitate servicing and functional adaptability. More particularly, the autonomous vehicle assembly 12 includes a chassis assembly 14 and a storage assembly 16. The storage assembly 16 is configured to be selectively attached and removed from the chassis assembly 14. The chassis assembly 14 includes a plurality of chassis modules including at least a front chassis module 18 and a rear chassis module 20. The front chassis module 18 is configured to be selectively attached to the rear chassis module 20. As shown, according to embodiments, the front and rear chassis modules 18, 20 are configured to be removably connectable to one another in end-to-end relationship with one another in a front-to-rear direction of the autonomous vehicle.

The chassis assembly 14 includes a plurality of wheels 22 including at least one wheel 22 on the front chassis module 18 and at least one wheel 22 on the rear chassis module 20. In some embodiments, the rear chassis module 20 includes two wheels 22 and the front chassis module 18 includes one wheel 22. At least one of the front chassis module 18 and the rear chassis module 20 include a propulsion assembly 24 and at least one of the front chassis module 18 and the rear chassis module 20 include an electronics, braking, and steering assembly (EBS assembly 26). In some embodiments, the rear chassis module 20 houses the propulsion assembly 24 and the front chassis module 18 houses the EBS assembly 26. As such, the chassis modules 18, 20 may be quickly and easily interchanged based on delivery and/or service requirements. For example, when the autonomous vehicle assembly 12 is scheduled for delivering heavier loads, loads at inclined gradients, longer travel paths, or combinations thereof the chassis module 18, 20 housing the propulsion assembly 24 may be interchanged with another chassis module 18, 20 housing a propulsion assembly 24 with greater power and/or range. Moreover, propulsion assemblies 24 may have interchangeable batteries of varying power and capacity for load and/or travel requirements.

With continued reference to FIG. 1, the autonomous vehicle assembly 12 includes an autonomous driving assembly 28 located in one of the modules. In some embodiments, the autonomous vehicle assembly 12 includes an autonomous driving module 30 that houses the autonomous driving assembly 28 and is configured to be selectively attached to the chassis assembly 14. As such, the autonomous driving module 30 may be quickly and easily interchanged based on delivery and/or service requirements. The autonomous driving assembly 12 is configured to manage self-driving of the autonomous vehicle.

Figure 2:
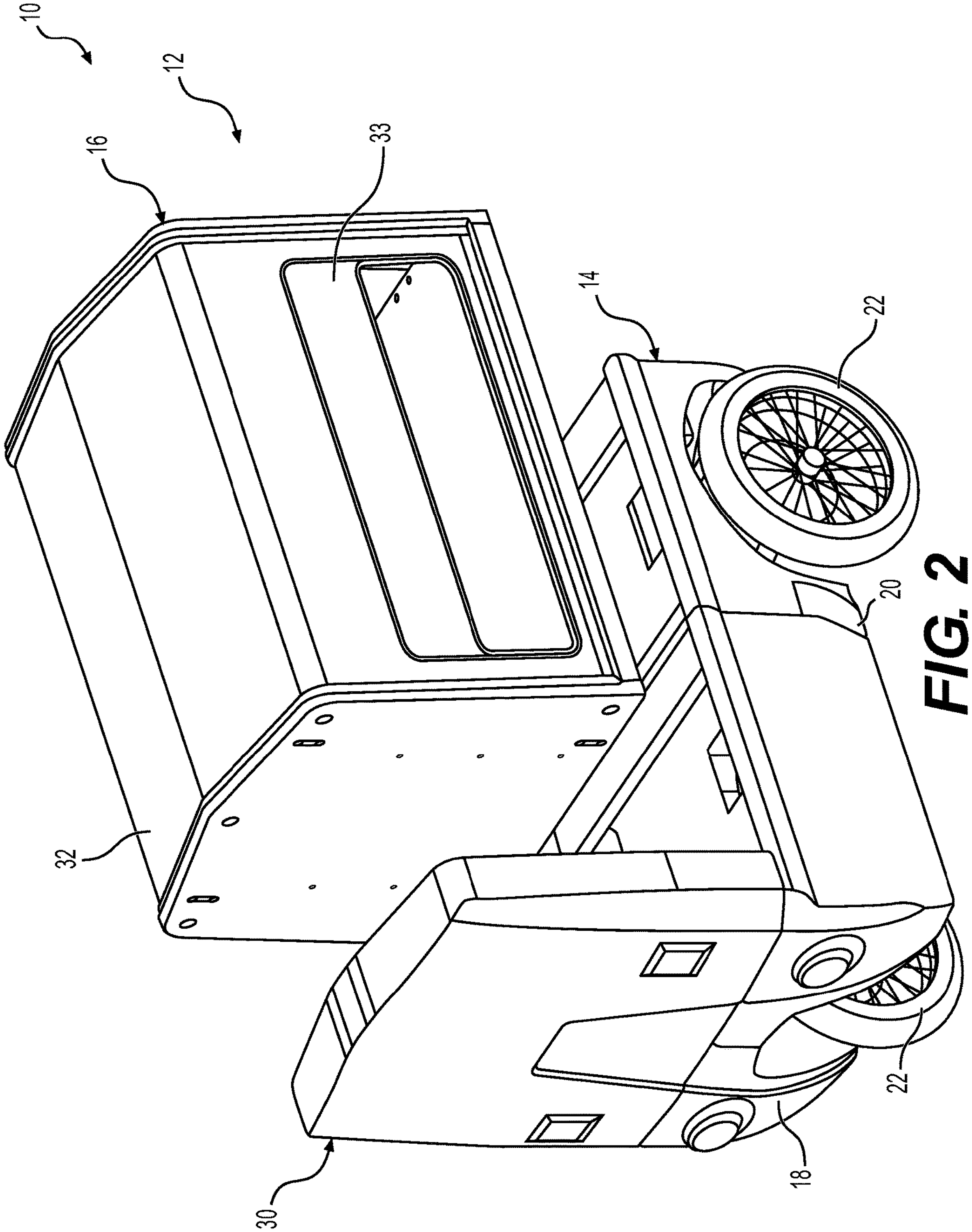
FIG. 2 is a perspective view of the autonomous vehicle assembly wherein a singular storage module is in the process of being removed from a chassis assembly.

The storage assembly 16 includes at least one storage module. In some embodiments, the at least one storage module includes a plurality of interchanging storage modules of different sizes and configurations for delivering inventory or other items of different sizes and shapes. In some embodiments, the at least one storage module includes a singular storage module 32 as illustrated in FIGS. 1 and 2. The singular storage module 32 includes a rolling cargo door 33 including an open position and a closed position. As will be described in greater detail below, the cargo door 33 may be electronically actuated via components of the chassis assembly 14. FIG. 1 illustrates the singular storage module 32 attached to the chassis assembly 14 and FIG. 2 illustrates the singular storage module 32 being removed from the chassis assembly 14.

Figure 3:
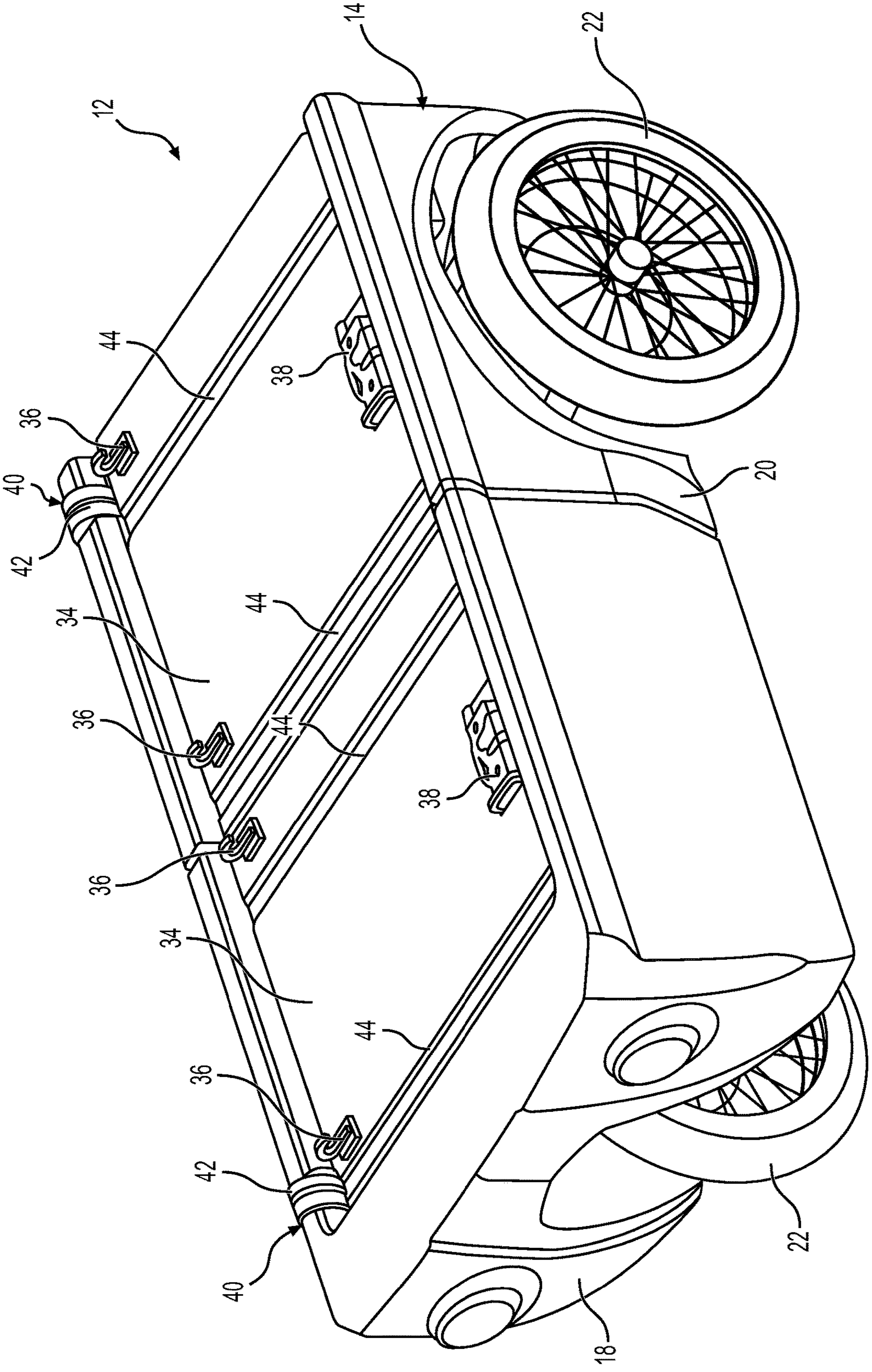
FIG. 3 is a perspective view of the chassis assembly.

FIG. 3 illustrates the chassis assembly 14 with the storage assembly 16 removed. The chassis assembly 14 is assembled with the front chassis module 18 and the rear chassis module 20. Each of the front chassis module 18 and the rear chassis module 20 includes a top surface 34 having connection feature for connecting the at least one storage module. In some embodiments, each chassis module 18, 20 includes a pair of hook latches 36 on a first lateral side (e.g., left side) and a cinching latch 38 on a second lateral side (e.g., right side). Each chassis module 18, 20 may further include a cargo door actuator 40 located the top surface 34 (e.g., adjacent to the first lateral side). In some embodiments, the cargo door actuator 40 includes a friction roller 42 that may be motor-driven and drives certain components (FIG. 8) of the at least one storage module. The top surface 34 of each chassis module 18, 20 may further include at least one (e.g., a pair) of grooves 44 for guiding the connection of the at least one storage module.

Figure 4:
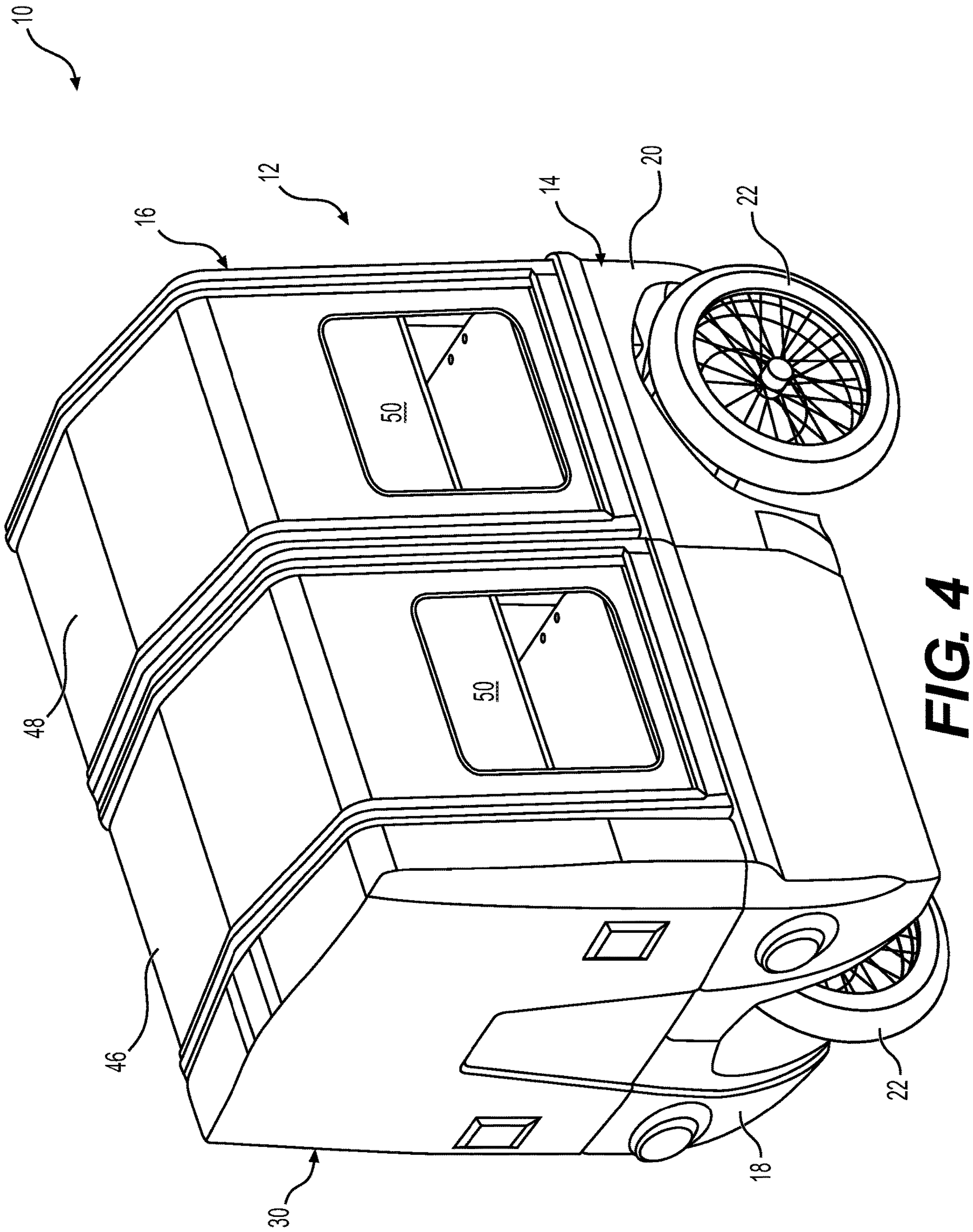
FIG. 4 is a perspective view of the autonomous vehicle assembly with a front storage module and a rear storage module located on the chassis assembly.

FIG. 4 illustrates the at least one storage module configured as a front storage module 46 and a rear storage module 48. In some embodiments, the front storage module 46 includes a bottom surface 47 (FIG. 7) that matches and connects to the top surface 34 of the front chassis module 18. In some embodiments, the rear storage module 48 includes a bottom surface 47 that matches and connects to the top surface 34 of the rear chassis module 20. In some embodiments, the singular storage module 32 includes a bottom surface that matches the top surface 34 of both the front chassis module 18 and the rear chassis module 20. The front storage module 46 and the rear storage module 48 includes a rolling cargo door 50 actuated by cargo door actuators 40 of the respective chassis modules 18, 20. The rolling cargo doors 33, 50 may be configured as a series of interconnected panels and/or flexible material that permits it to move between contorted or rolled position and a non-contorted or unrolled position.

Figure 5:
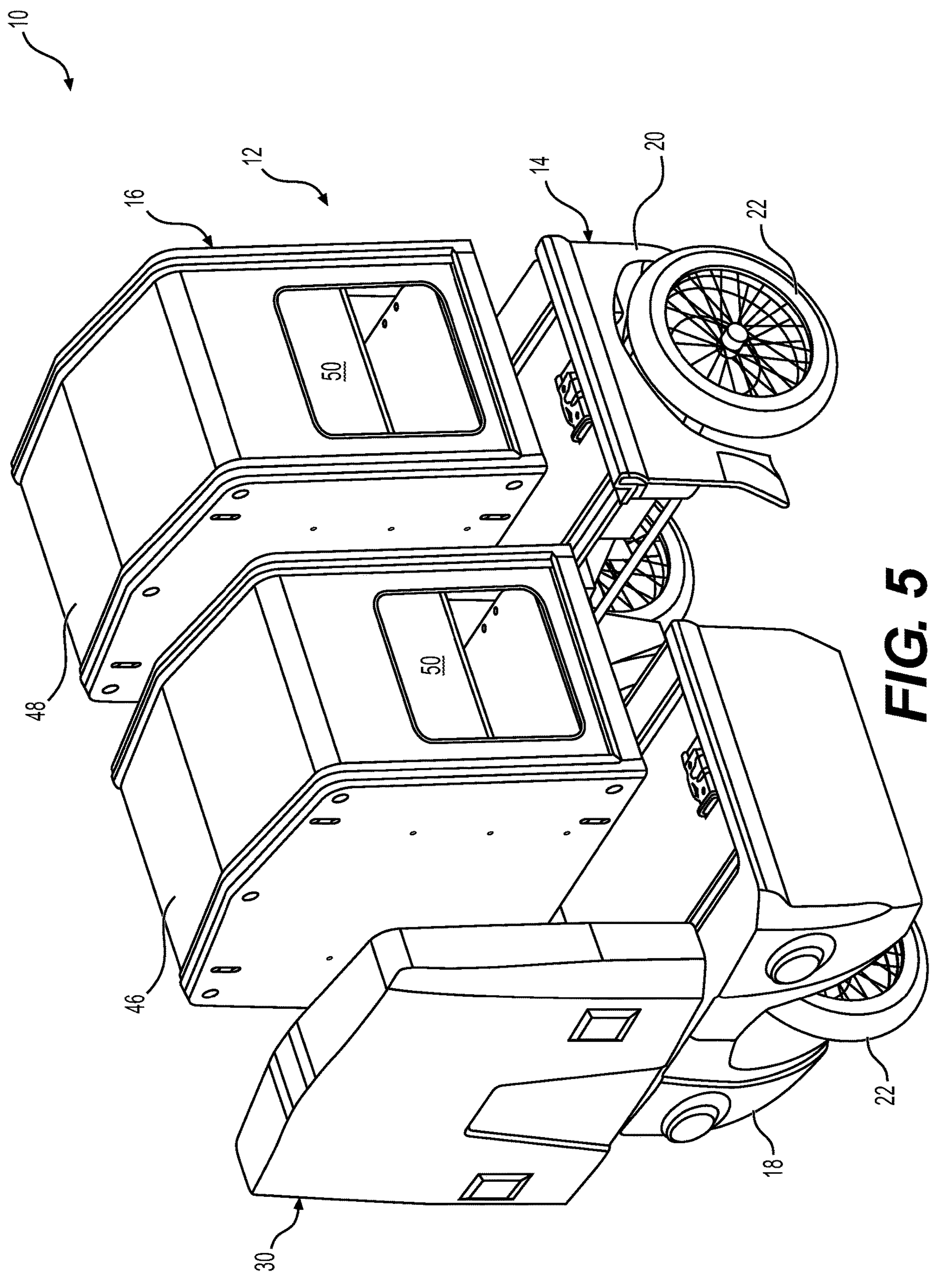
FIG. 5 is a perspective disassembled view of the autonomous vehicle assembly.

FIG. 5 illustrates the storage modules 46, 48 and the autonomous driving module 30 in the process of being removed from the chassis assembly 14 and the front chassis module 18 and the rear chassis module 20 disconnected from one another.

Figure 6:
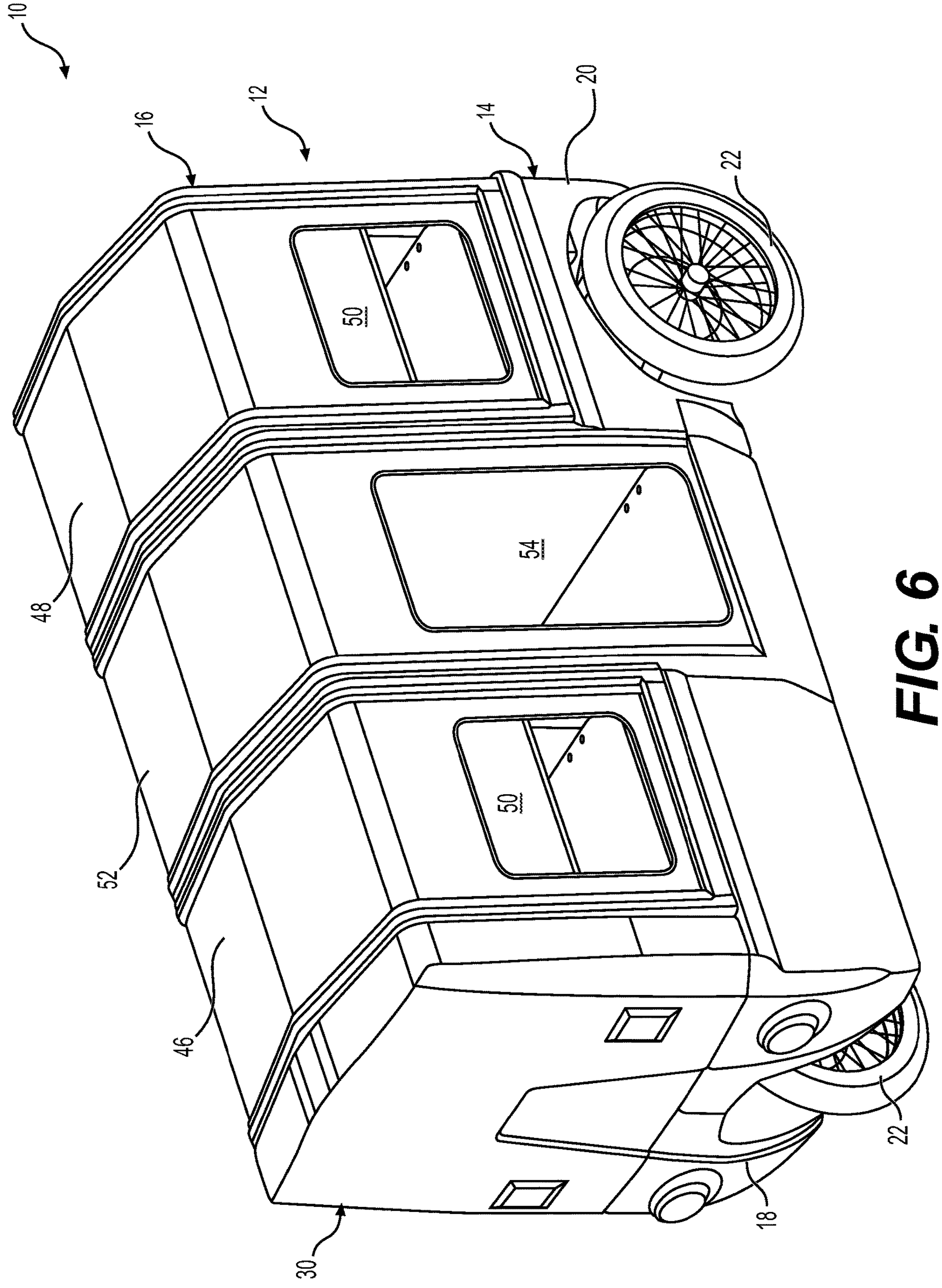
FIG. 6 is a perspective view of the autonomous vehicle assembly with a central storage module located between the front storage module and the rear storage module.

FIG. 6 illustrates the configuration of the autonomous vehicle assembly 12 illustrated in FIGS. 4 and 5 wherein the at least one storage module further includes a central storage module 52. In some embodiments, the central storage module 52 is located between, spaces, and connects to the front storage module 46 and the rear storage module 48. In some embodiments, the central storage module 52 is located between, spaces, and connects to the front chassis module 18 and the rear chassis module 20. The central storage module 52 may therefore be configured to hold larger items of inventory than either the front storage module 46 and the rear storage module 48. The central storage module 52 may include a cargo door 54.

Figure 7:
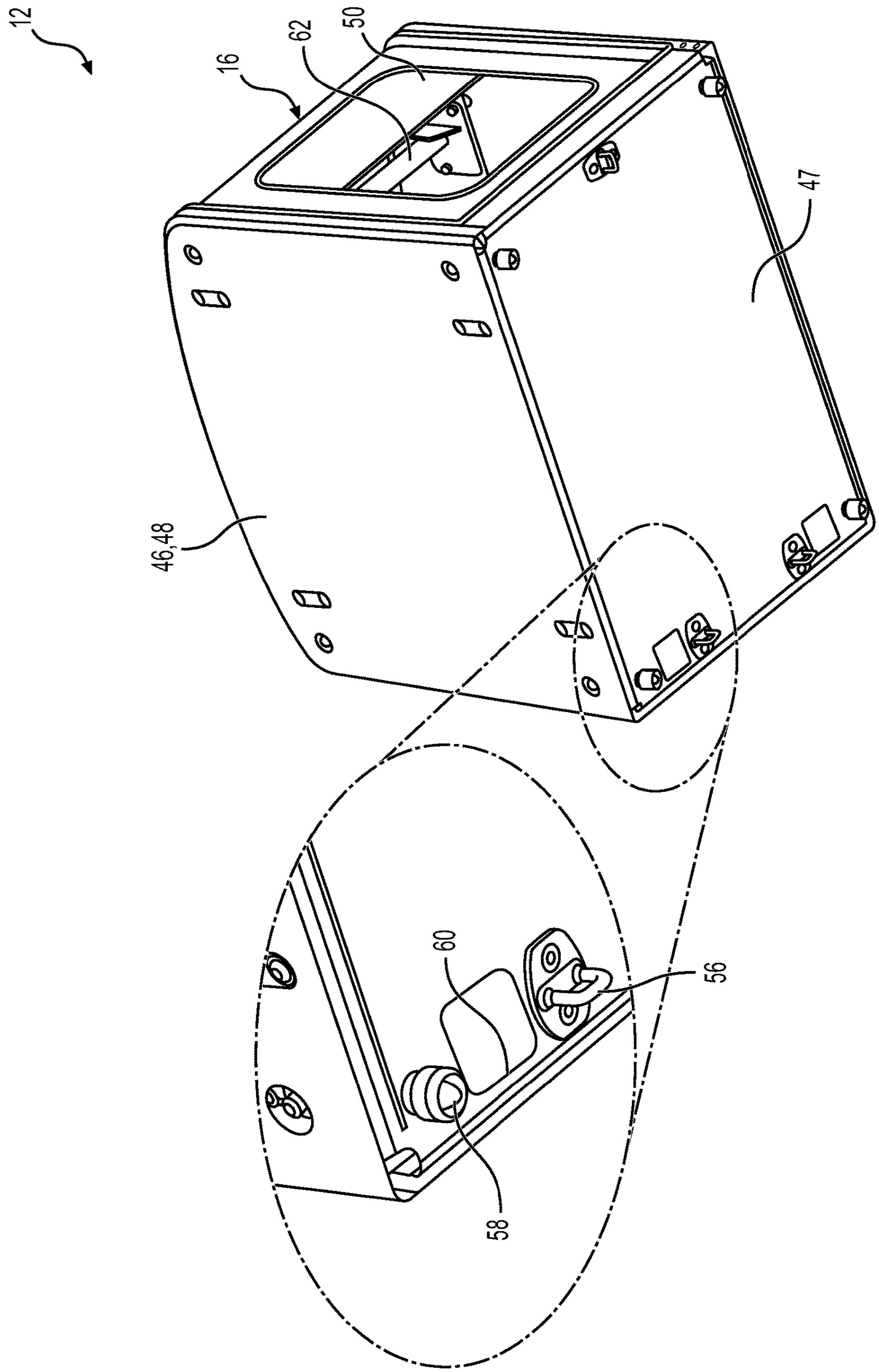
FIG. 7 is a perspective bottom view illustrating connection features of one of the storage modules.
Figure 8:
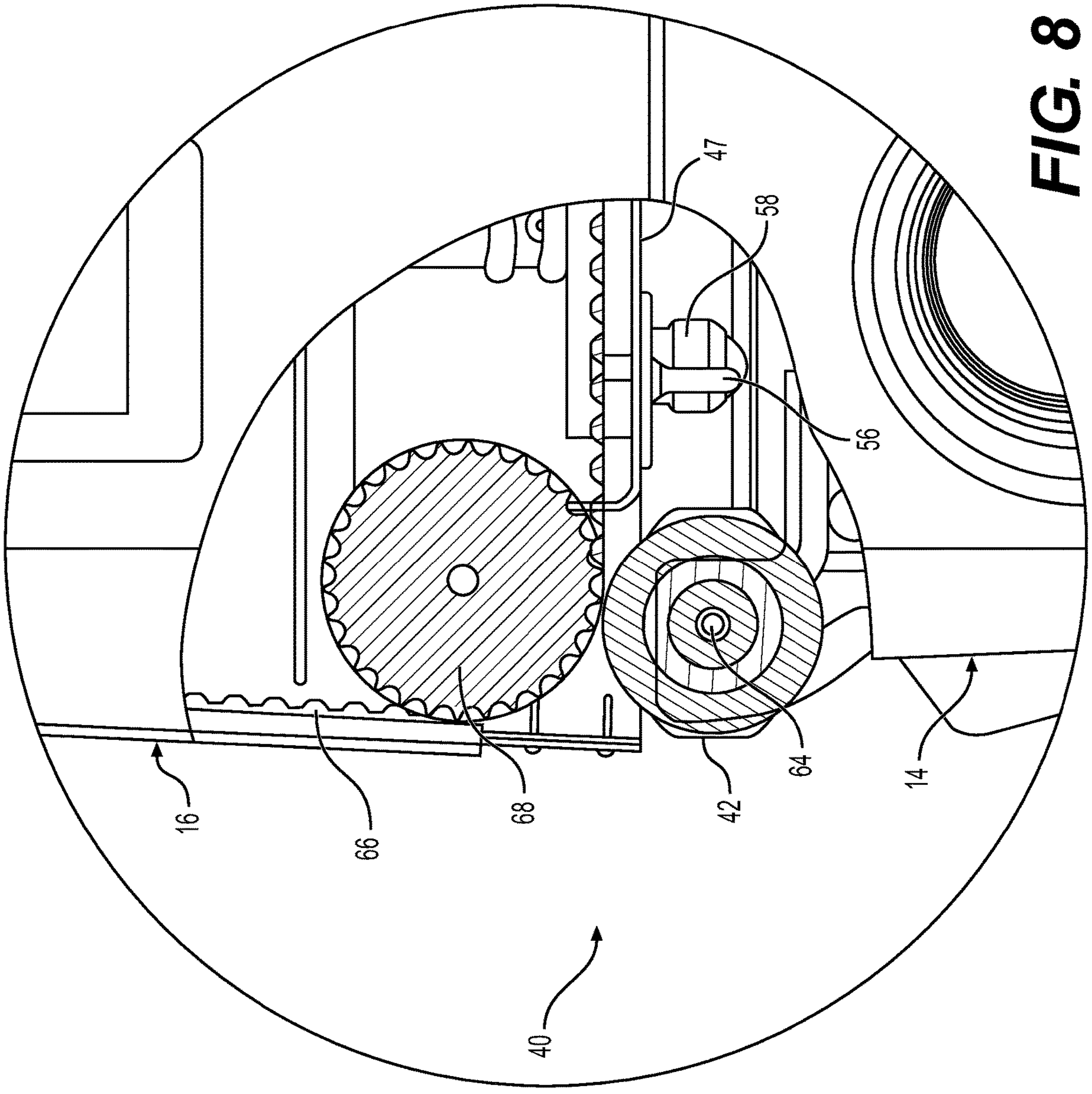
FIG. 8 is a cross-sectional view of the autonomous vehicle assembly illustrating a connection between the chassis assembly and one of the storage modules.

With reference to FIG. 7, the storage modules may include connection mechanisms for facilitating connection to the chassis assembly 14. In some embodiments, the storage modules each include strikers 56 for connection to the a pair of hook latches 36 and the cinching latch 38. In some embodiments, the storage modules each include rollers 58. For example, the rollers may be configured as spherical rollers. During assembly, the rollers 58 are located in the grooves 44 opposite the hook latches 36 and pushed towards the hook latches 36 whereat a striker 56 enters each of the hook latches 36 and a striker 56 on the opposite end is placed and locked in the cinching latch 38. An opening 60 is provided on the bottom surface 47 for operably connecting the cargo door actuator 40 to the storage module (FIG. 8). Each storage module may further include internal supporting structures 62 that may be configured to provide structural support and/or organize inventory or other items therein.

FIG. 8 is a cross-sectional view illustrating the connection between the cargo door actuator 40 and the cargo doors 33, 50 of the storage modules. In some embodiments, the friction roller 42 is located on a pin 64 that drives the friction roller 42 via operable connection to a motor (not shown). In some embodiments, the cargo doors 33, 50 are operably connected to a belt 66 and a belt roller 68. The belt 66 and the belt roller 68 may include intermeshed teeth. The friction roller 42 contacts the belt 66 on an opposite side of the belt roller 68 and drives the belt 66 to move the cargo doors 33, 50 between open and closed positions.

Figure 9:
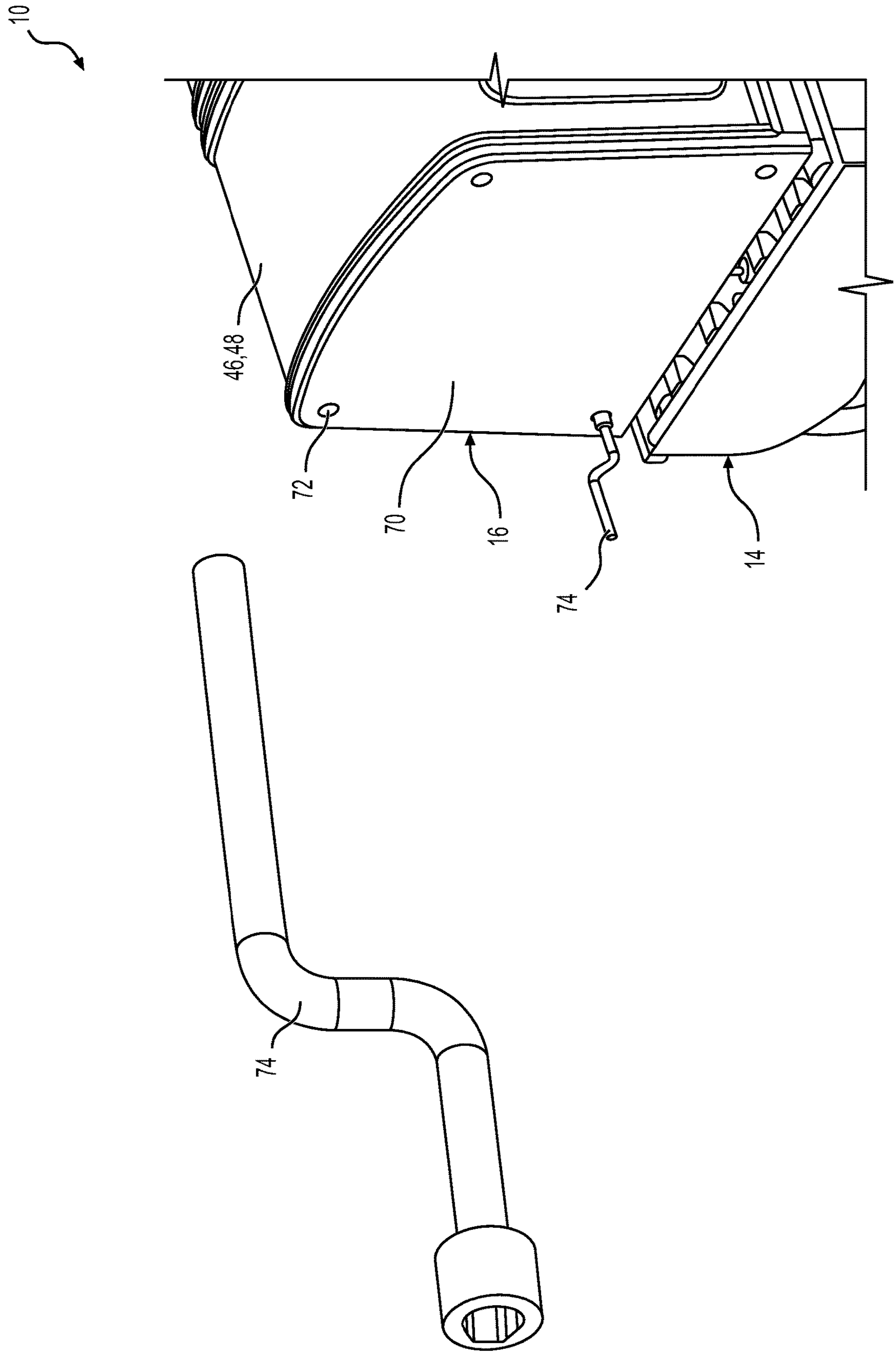
FIG. 9 is a perspective side view of a storage module and a tool for opening and closing a storage module door when the associated module is not attached to the chassis assembly.

FIG. 9 illustrates a side panel 70 of the storage module that may include connections 72 keyed therein such that one or more tools 74 can be used to open and close the rolling door 33, 50 when the storage module is not mounted to the vehicle. In some embodiments, the tool 74 may connect to the belt roller 68 for manual rotation thereof.

Figure 10:
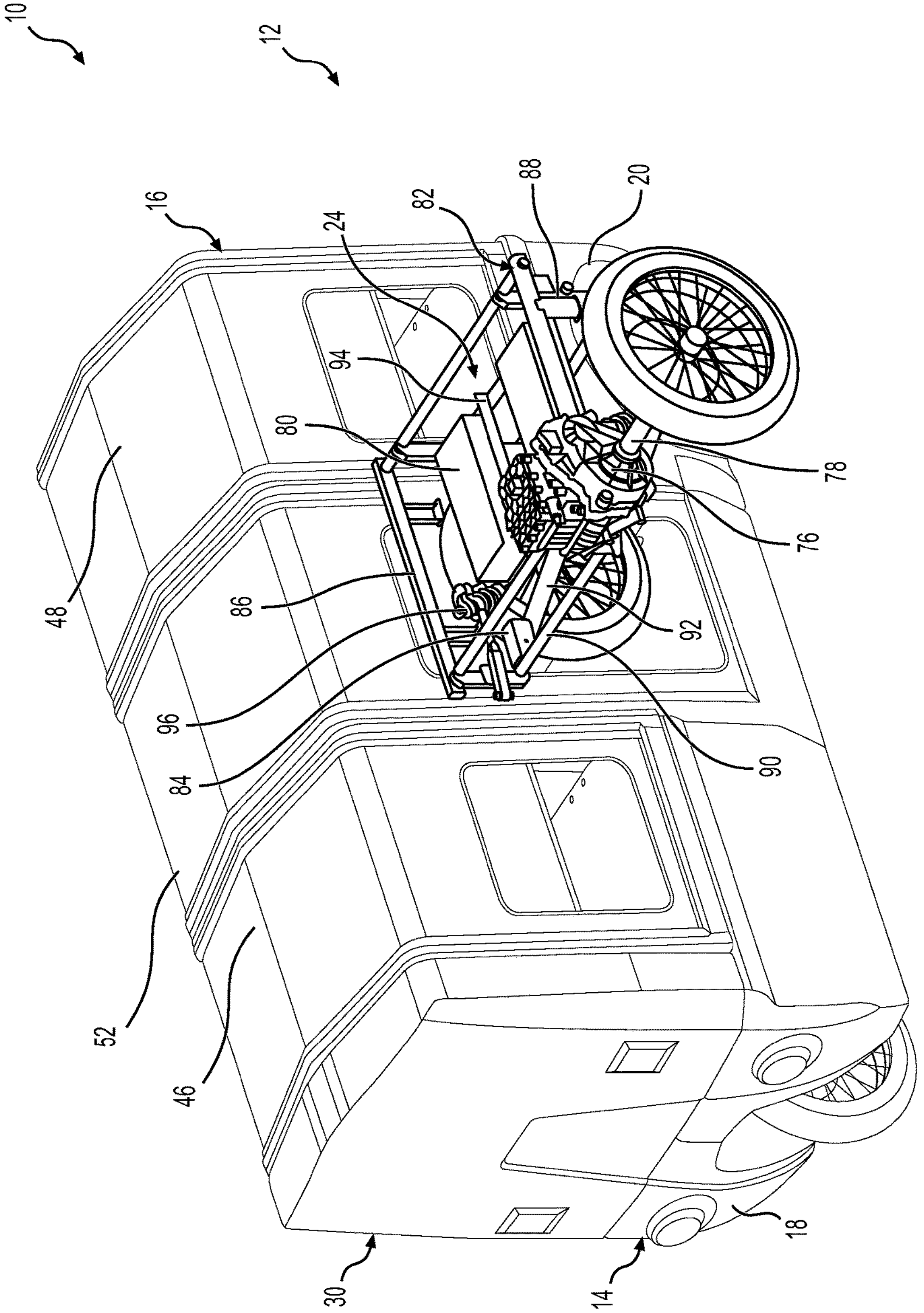
FIG. 10 is a perspective view of the autonomous vehicle assembly illustrating a propulsion assembly in the chassis assembly.
Figure 11:
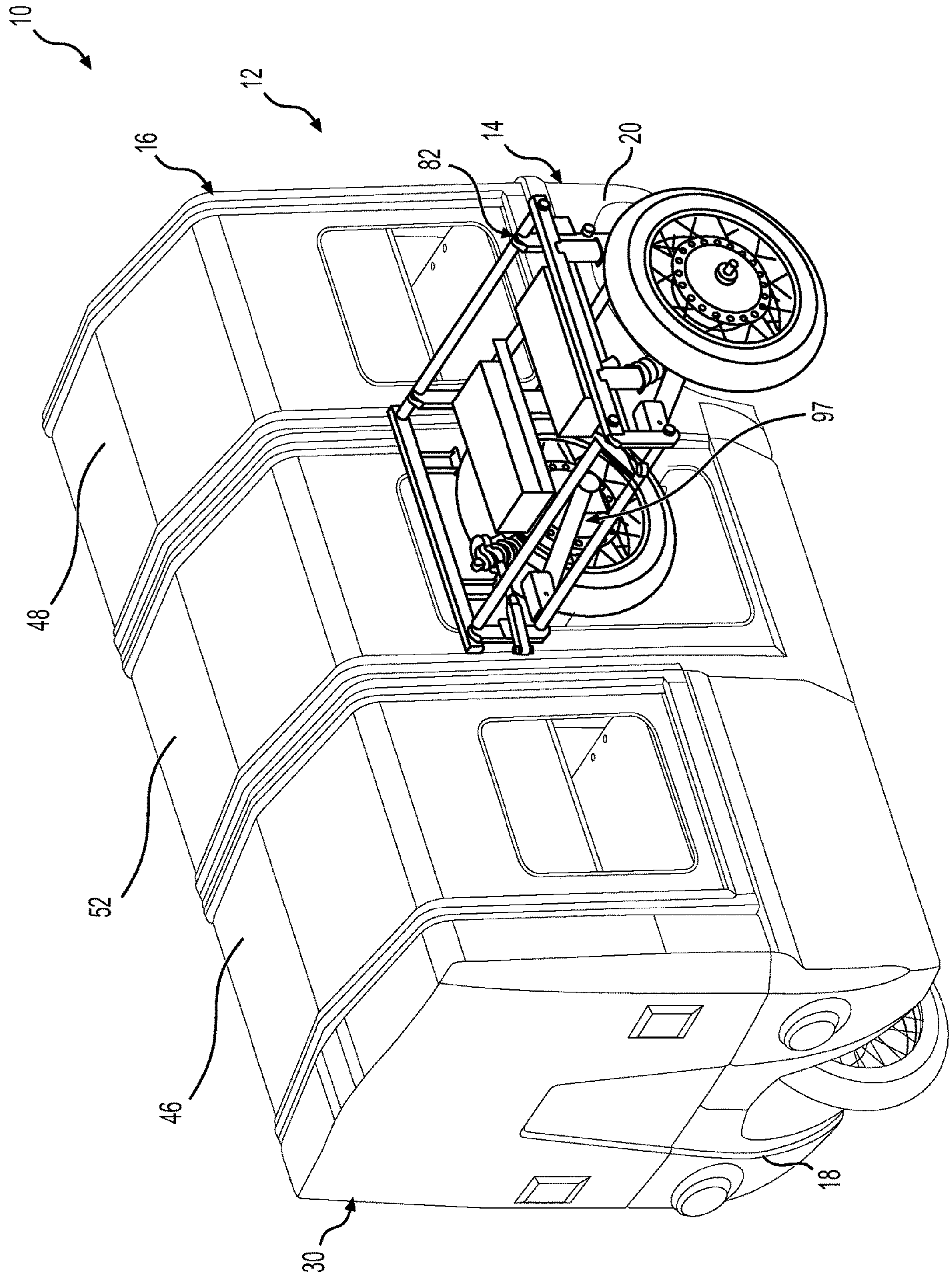
FIG. 11 is a perspective view of the autonomous vehicle assembly illustrating additional components of the propulsion assembly.

FIG. 10 is a perspective view of the autonomous vehicle assembly 12 illustrating the propulsion assembly 24 in the chassis assembly 14. The propulsion assembly 24 may include an electric motor 76 operably connected to a drive shaft 78 that causes the wheels 22 to turn and the autonomous vehicle assembly 12 to move. The propulsion assembly 24 may further include at least one battery 80 for providing power to the electric motor 76. The propulsion assembly 24 may be located in the storage module via a frame 82. FIG. 11 illustrates the frame 82 with the electric motor 76 removed therefrom. The frame 82 includes a basket portion defined by a pair of latitudinal members 84 being spaced by a pair of longitudinal members 86. A series of vertical members 88 extend downwardly from the basket portion to at least one lower lateral member 90. Linkages 92 extend from the lower lateral member 90 to the drive shaft 78. At least one battery holding bracket 94 carries the at least one battery 80 such that it can be easily removed and replaced. Each wheel 22 includes a suspension assembly 96. In some embodiments, the propulsion assembly 24 includes a hub motor 97 that is directly connected to one or more of the wheels 22 (e.g., at least one wheel 22 in the front chassis assembly 18, at least one wheel 22 in the rear chassis assembly 20, or a combination thereof).

Figure 12:
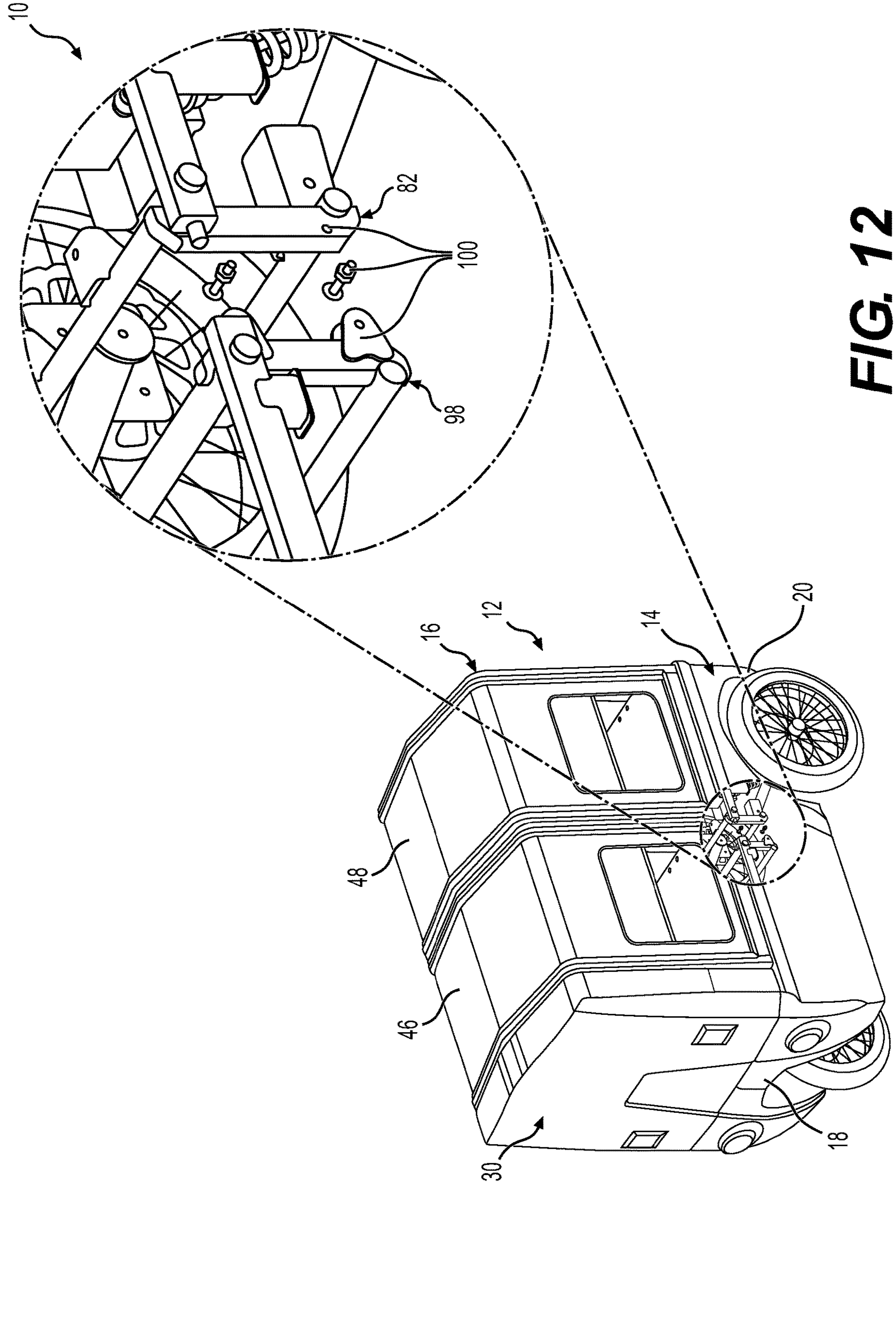
FIG. 12 is a perspective view of the autonomous vehicle assembly illustrating connection between a front chassis module and a rear chassis module of the chassis assembly.

FIG. 12 is a perspective view of the autonomous vehicle assembly 12 illustrating connection between the front chassis module 18 and the rear chassis module 20 of the chassis assembly 14. More particularly, the front chassis module 18 includes a front frame 98 for locating components of the EBS assembly 26 and connecting the front chassis module 18 to the rear chassis module 20. In some embodiments, the front frame 98 includes a basket portion similar to the frame 82 of the rear chassis module 20. The frame 82 of the rear chassis module 20 connects to the front frame 98 of the front chassis module 18 via at least one pivot pin and bracket 100. In some embodiments, the at least one pivot pin and bracket 100 includes a pair of vertically spaced pivot pin and brackets 100 located adjacent to one lateral side and a pair of vertically spaced pivot pin and brackets 100 located adjacent to an opposite lateral side. It should be appreciated that the arrangement of pivot pins and brackets 100 allow the front and rear frames 98, 82 to quickly and easily be connected and disconnected from one another.

Figure 13:
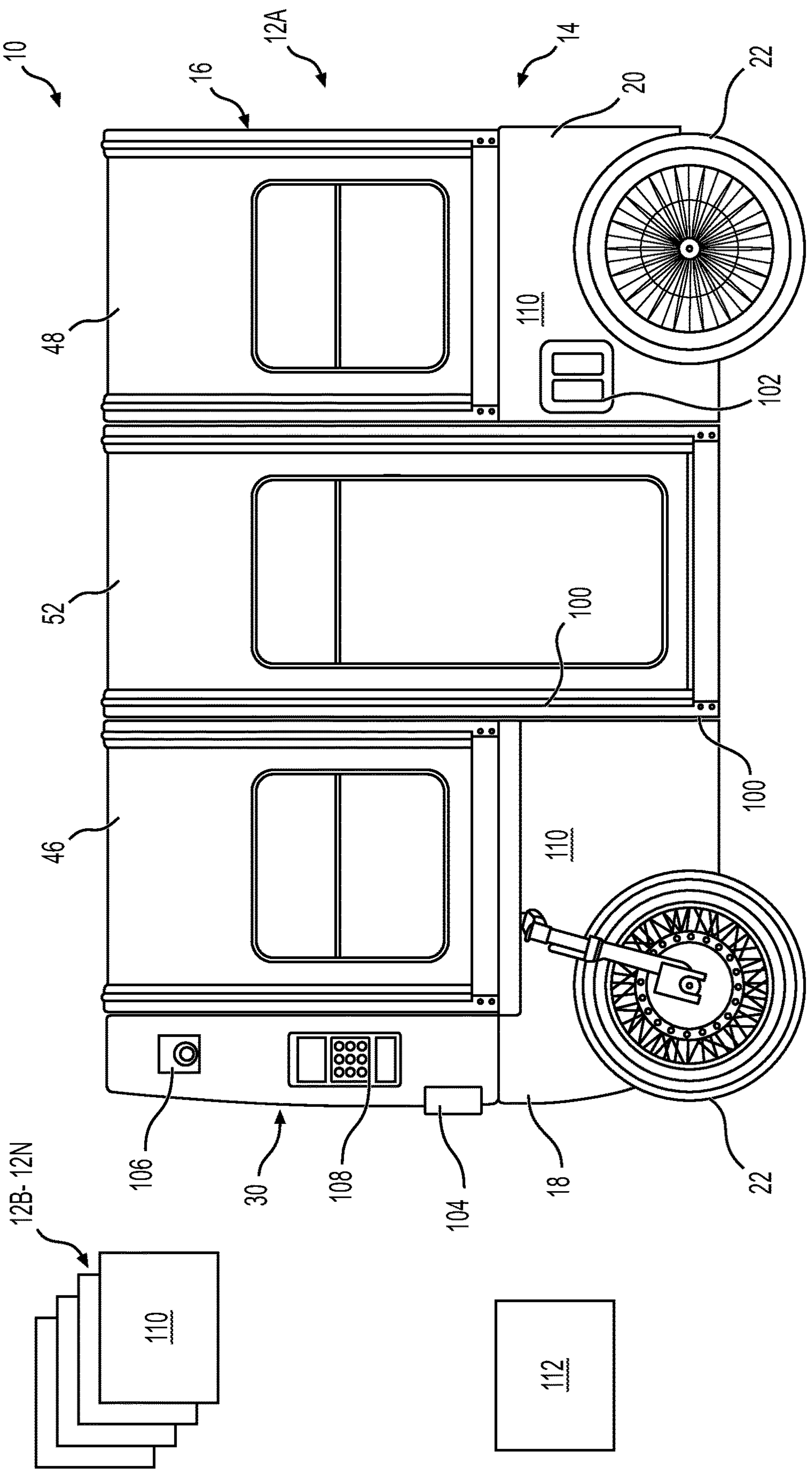
FIG. 13 is a side view of the autonomous vehicle assembly illustrating additional features of the various modules.

FIG. 13 is a side view of the autonomous vehicle assembly 12 illustrating additional features of the various modules. More particularly, the central storage module 52 may include portions of the pivot pin and bracket 100 for connection to both the chassis modules 18, 20. The chassis module 18, 20 housing the propulsion module 24 may include an opening 102 for providing access to the battery 100 such that it can be periodically replaced and/or charged. The autonomous driving assembly 28 in the autonomous driving module 30 may include any number of sensors 104, cameras 106, and controllers and processors 108 for dictating the speed, direction, travel path, and obstacle avoidance of the autonomous vehicle assembly 12 and the opening and closing of the cargo doors. Communication between the autonomous driving assembly 28, the propulsion assembly 24, and the EBS assembly 26 may be via a series of transmission modules 110. In some embodiments, the transmission modules 110 wirelessly (or via wires) receive information from at least one controller and processor 108 and are located in each of the chassis modules 18, 20. In some embodiments, the at least one controller and processor 108 are in further communication with a remote computing device 112 for scheduling, organizing, and updating software on local memories in a fleet of a plurality of autonomous vehicle assemblies 12A through 12N. In some embodiments, the at least one controller and processor 108 are in further communication with other autonomous vehicle assemblies 12B-12N via a mesh network.

It should be appreciated that the foregoing description of the embodiments has been provided for purposes of illustration. In other words, the subject disclosure it is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. An autonomous vehicle assembly comprising:
- a chassis assembly including a front chassis module and a rear chassis module being selectively connectable to one another, wherein the front chassis module includes a front frame, wherein the rear chassis module includes a rear frame, wherein the rear frame connects to the front frame via at least one pivot pin and bracket, wherein the at least one pivot pin and bracket includes a pair of vertically spaced pivot pins and brackets located adjacent to one lateral side and a pair of vertically spaced pivot pins and brackets located adjacent to an opposite lateral side, wherein the front frame and the rear frame are removeably connectable to one another in end-to-end relationship with one another in a front-to-rear direction of the autonomous vehicle assembly;
- the front chassis module including at least one front wheel and the rear chassis module including at least one rear wheel;
- an electronics, braking and steering (EBS) assembly located in at least one of the front chassis module and the rear chassis module for steering at least one of the at least one front wheel and the at least one rear wheel;
- a propulsion assembly located in at least one of the front chassis module and the rear chassis module for driving at least one of the at least one front wheel and the at least one rear wheel;
- at least one storage assembly connectable to the at least one of the front and rear chassis modules; and
- an autonomous driving module connectable to one of the front and rear chassis modules independently of the storage assembly, and in communication with the EBS assembly and the propulsion assembly for managing self-driving of the autonomous vehicle assembly.

2. The autonomous vehicle assembly of claim 1, wherein the autonomous driving module includes at least one sensor, at least one camera and at least one controller configured to dictate a speed, direction, and a travel path of the autonomous vehicle assembly.

3. The autonomous vehicle assembly of claim 1, wherein the at least one storage assembly includes at least one cargo door being moveable between open and closed positions.

4. The autonomous vehicle assembly of claim 3, wherein a cargo door actuator is positioned on a top surface of at least one of the front chassis module and the rear chassis module, and wherein the cargo door actuator is configured to move the cargo door between the open and closed positions.

5. The autonomous vehicle assembly of claim 4, wherein the cargo door actuator includes at least one powered friction roller that is configured to move a belt that is coupled with the cargo door to move the cargo door between the open and closed positions.

6. The autonomous vehicle assembly of claim 1, wherein the at least one storage assembly comprises a plurality of interchangeable storage modules of different shapes.

7. The autonomous vehicle assembly of claim 1, wherein the at least one storage assembly includes a central storage module selectively attached to the front chassis module and the rear chassis module to space the front chassis module and the rear chassis module and to extend a storage space.

8. The autonomous vehicle assembly of claim 1, wherein the front chassis module includes the front frame, wherein the rear chassis module includes the rear frame, wherein the front and rear frames are configured to support the propulsion assembly and the EBS assembly, and wherein the front and rear frames are removeably connectable to one another.

9. The autonomous vehicle assembly of claim 8, wherein the pivot pins are removeable pivot pins.

10. The autonomous vehicle assembly as set forth in claim 1, wherein the front and rear chassis modules each have a top surface, and wherein the autonomous driving module and the at least one storage assembly are selectively connectable to the top surfaces.

11. The autonomous vehicle assembly as set forth in claim 10, wherein the top surface of each of the front and rear chassis modules includes at least one latch, and wherein a bottom surface of the at least one storage assembly includes at least one striker for being releasably connected to the at least one latch to connect the at least one storage assembly to the top surface.

12. The autonomous vehicle assembly as set forth in claim 1, wherein the front and rear chassis modules each have a front end and a rear end, wherein the rear end of the front chassis module and the front end of the rear chassis module are planar, and wherein the rear end of the front chassis module and the front end of the rear chassis module are flush with one another when the front and rear chassis modules are connected to one another.

13. An autonomous vehicle assembly comprising:
- a chassis assembly including a front chassis module and a rear chassis module being selectively connectable to one another wherein the front chassis module includes a front frame, wherein the rear chassis module includes a rear frame, wherein the rear frame is removeably connectable to the front frame via at least a pair of pivot pins and brackets each located adjacent to opposing lateral sides of the front and rear frames, and wherein the front frame and the rear frame are removeably connectable to one another in end-to-end relationship with one another in a front-to-rear direction of the autonomous vehicle assembly;
- the front chassis module including at least one front wheel and the rear chassis module including at least one rear wheel;
- an EBS assembly located in at least one of the front chassis module and the rear chassis module for steering at least one of the at least one front wheel and the at least one rear wheel;
- a first propulsion assembly located in at least one of the front chassis module and the rear chassis module for driving at least one of the at least one front wheel and the at least one rear wheel to propel the front and rear chassis modules together;
- at least one replacement front chassis module and replacement rear chassis module, wherein one of the replacement front chassis module and the replacement rear chassis modules has a second propulsion assembly, wherein the at least one of the front chassis module and the rear chassis module having the first propulsion assembly can be interchanged with one of the replacement front chassis module and the replacement rear chassis module, wherein the second propulsion assembly includes a different power level from the first propulsion assembly.

14. An autonomous vehicle assembly, comprising:

a chassis assembly including a front chassis module and a rear chassis module being selectively connectable to one another wherein the front chassis module includes a front frame, wherein the rear chassis module includes a rear frame, wherein the rear frame is removeably connectable to the front frame via at least a pair of pivot pins and brackets each located adjacent to opposing lateral sides of the front and rear frames, and wherein the front frame and the rear frame are removeably connectable to one another in end-to-end relationship with one another in a front-to-rear direction of the autonomous vehicle assembly;

wherein the front chassis module has a rear end of the front frame, wherein the rear chassis module has a front end of the rear frame, wherein the rear end of the front chassis module is along a first plane, wherein the front end of the rear chassis module is along a second plane, and wherein the rear end of the front chassis module directly contacts and is flush with the front end of the rear chassis module when the front and rear chassis modules are connected to one another;

the front chassis module including at least one front wheel and the rear chassis module including at least one rear wheel;

a first propulsion assembly located in at least one of the front chassis module and the rear chassis module for driving at least one of the at least one front wheel and the at least one rear wheel;

an autonomous driving module in communication with the first propulsion assembly and configured to manage self-driving of the autonomous vehicle assembly; and a storage assembly selectively attachable to at least one of the front and rear chassis modules for storing items on the autonomous vehicle assembly.

15. The autonomous vehicle assembly as set forth in claim 14, wherein the storage assembly includes a plurality of storage modules being interchangeable.

16. The autonomous vehicle assembly as set forth in claim 15, wherein the plurality of storage modules includes a front storage module connectable to the front chassis module and a rear storage module connectable to the rear chassis module.

17. The autonomous vehicle assembly as set forth in claim 16, wherein the front and rear storage modules each include a cargo door being moveable between open and closed positions.

18. The autonomous vehicle assembly as set forth in claim 14, further including at least one replacement front chassis module and replacement rear chassis module with a second propulsion assembly, wherein the at least one of the front chassis module and the rear chassis module including the first propulsion assembly can be interchanged with one of the replacement front chassis module and the replacement rear chassis module, wherein the second propulsion assembly includes a different power level from the first propulsion assembly.

* * * * *